Sept. 18, 1951 C. E. BALLARD 2,568,535

BOARD FOR DEMONSTRATING ELECTRIC CIRCUITS

Filed April 10, 1945 5 Sheets-Sheet 1

Inventor
CHARLES E. BALLARD

By Church & Church
His Attorneys

Sept. 18, 1951 C. E. BALLARD 2,568,535

BOARD FOR DEMONSTRATING ELECTRIC CIRCUITS

Filed April 10, 1945 5 Sheets-Sheet 2

Inventor

CHARLES E. BALLARD

By Church & Church

His Attorneys

BOARD FOR DEMONSTRATING ELECTRIC CIRCUITS

Filed April 10, 1945 5 Sheets-Sheet 3

Inventor
CHARLES E. BALLARD
By Church & Church
His Attorneys

BOARD FOR DEMONSTRATING ELECTRIC CIRCUITS

Filed April 10, 1945 5 Sheets-Sheet 4

Inventor
CHARLES E. BALLARD

By Church & Church

His Attorneys

Sept. 18, 1951 C. E. BALLARD 2,568,535

BOARD FOR DEMONSTRATING ELECTRIC CIRCUITS

Filed April 10, 1945 5 Sheets-Sheet 5

Inventor
CHARLES E. BALLARD
By Church & Church
His Attorneys

Patented Sept. 18, 1951

2,568,535

UNITED STATES PATENT OFFICE 2,568,535

BOARD FOR DEMONSTRATING ELECTRIC CIRCUITS

Charles E. Ballard, Ogden, Utah

Application April 10, 1945, Serial No. 587,583

2 Claims. (Cl. 35—19)

This invention relates primarily to an educational device and particularly to a board for demonstrating electrical circuits.

The present board is designed especially to serve as an aid in teaching the theory and practice of radio, radar, television and allied electronic devices and an object of the present invention is to provide a board or panel which possesses versatility or flexibility in the sense that a multitude of different types of circuits, particularly electronic circuits, can be formed or set up thereon with great rapidity.

Since electronic tube circuits fundamentally comprise an electronic tube or tubes, plus certain associated parts or instrumentalities, a further object of the invention is to provide a board or panel having a multiplicity of electric contacts or terminals thereon so arranged with respect to one or more multi-terminal tube sockets that each socket and its associated contacts constitutes a unit which may be used alone or in conjunction with one or more other units, depending upon the size of the board and the number of units provided thereon. In this way, the flexibility of the board is materially increased.

With these and other objects, the invention consists in certain details of construction and combinations and arrangements of parts, all as will hereinafter be more fully described and the novel details thereof particularly pointed out in the appended claims.

In the accompanying drawings—

Figure 1:
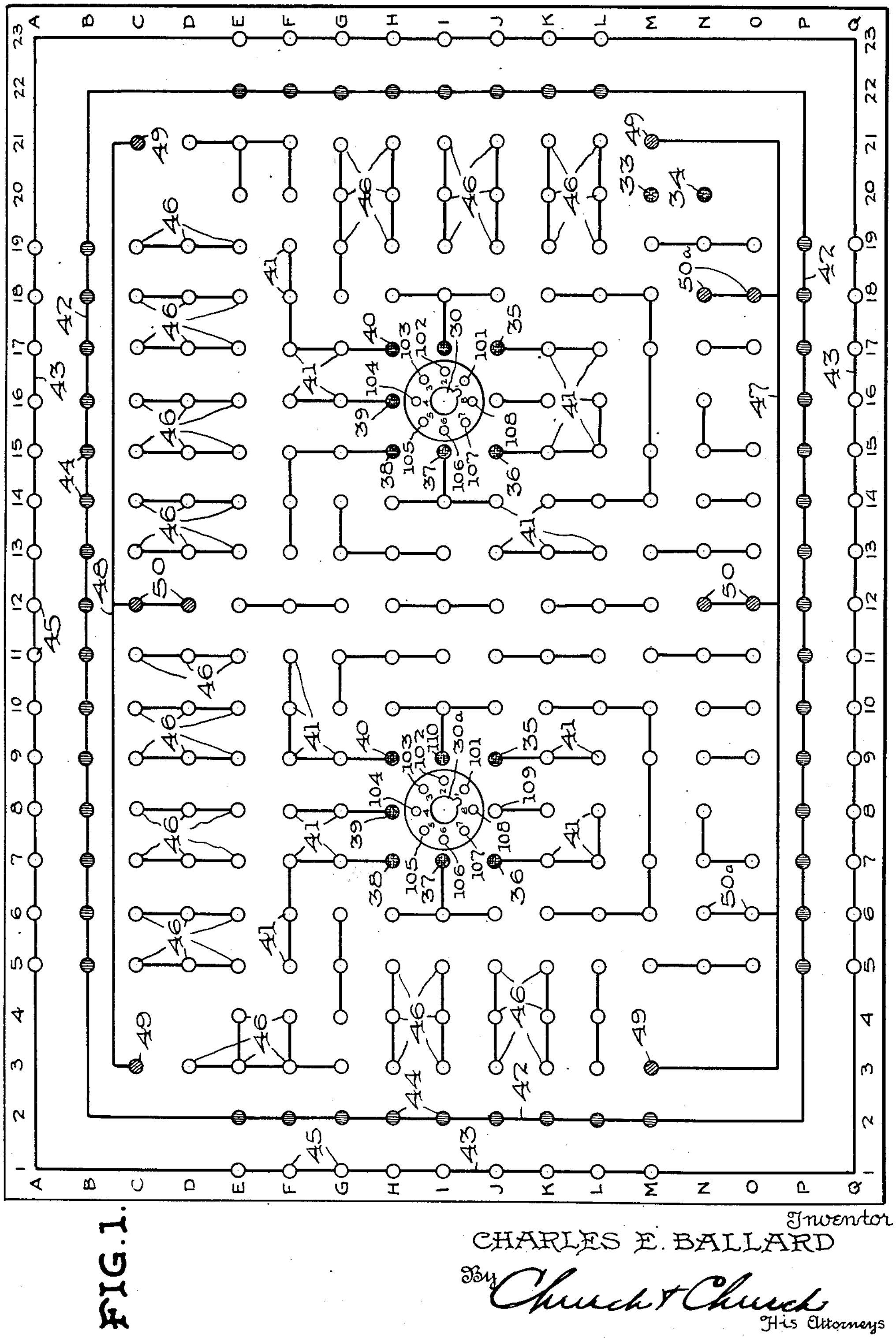
Figure 2:
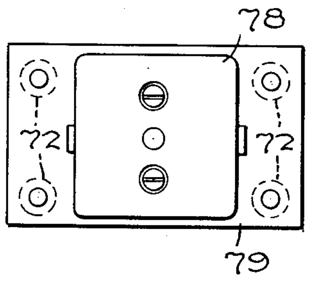
Figure 2A:
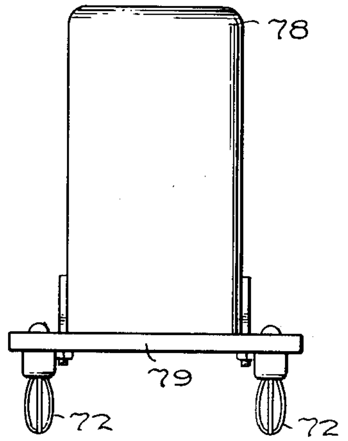
Figure 2B:
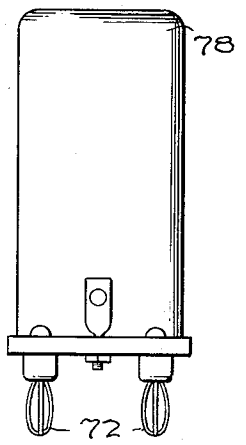
Figure 3:
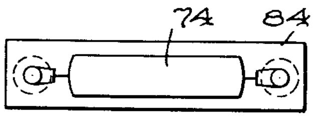
Figure 3A:
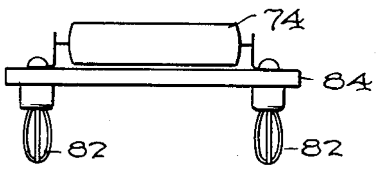
Figure 3B:
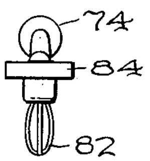
Figure 4:
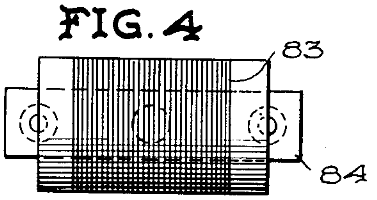
Figure 4A:
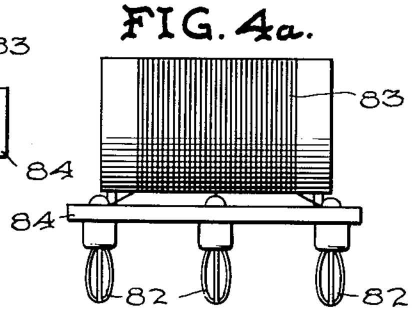
Figure 4B:
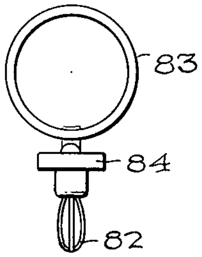
Figure 5:
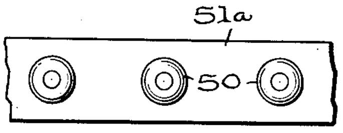
Figure 5A:
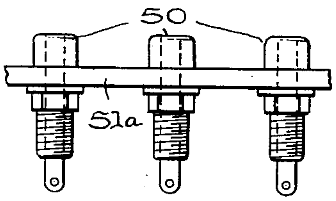
Figure 5B:
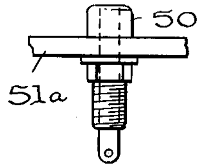

Figure 1 is a diagrammatical illustration of a board or panel embodying what is at present believed to be the preferred form of the present invention;

Figs. 2, 2ᵃ and 2ᵇ are top, side and end views, respectively, of a transformer assembly for use on the board;

Figs. 3, 3ᵃ and 3ᵇ are top, side and end views, respectively, of a resistor unit assembly;

Figs. 4, 4ᵃ and 4ᵇ are top, side and end views, respectively, of an inductor assembly;

Fig. 5 is a top plan view of a section of the board, illustrating a series of three contacts in the form of sockets;

Fig. 5ᵃ is a side elevation and Fig. 5ᵇ is an end elevation of the panel section shown in Fig. 5.

Figure 6:
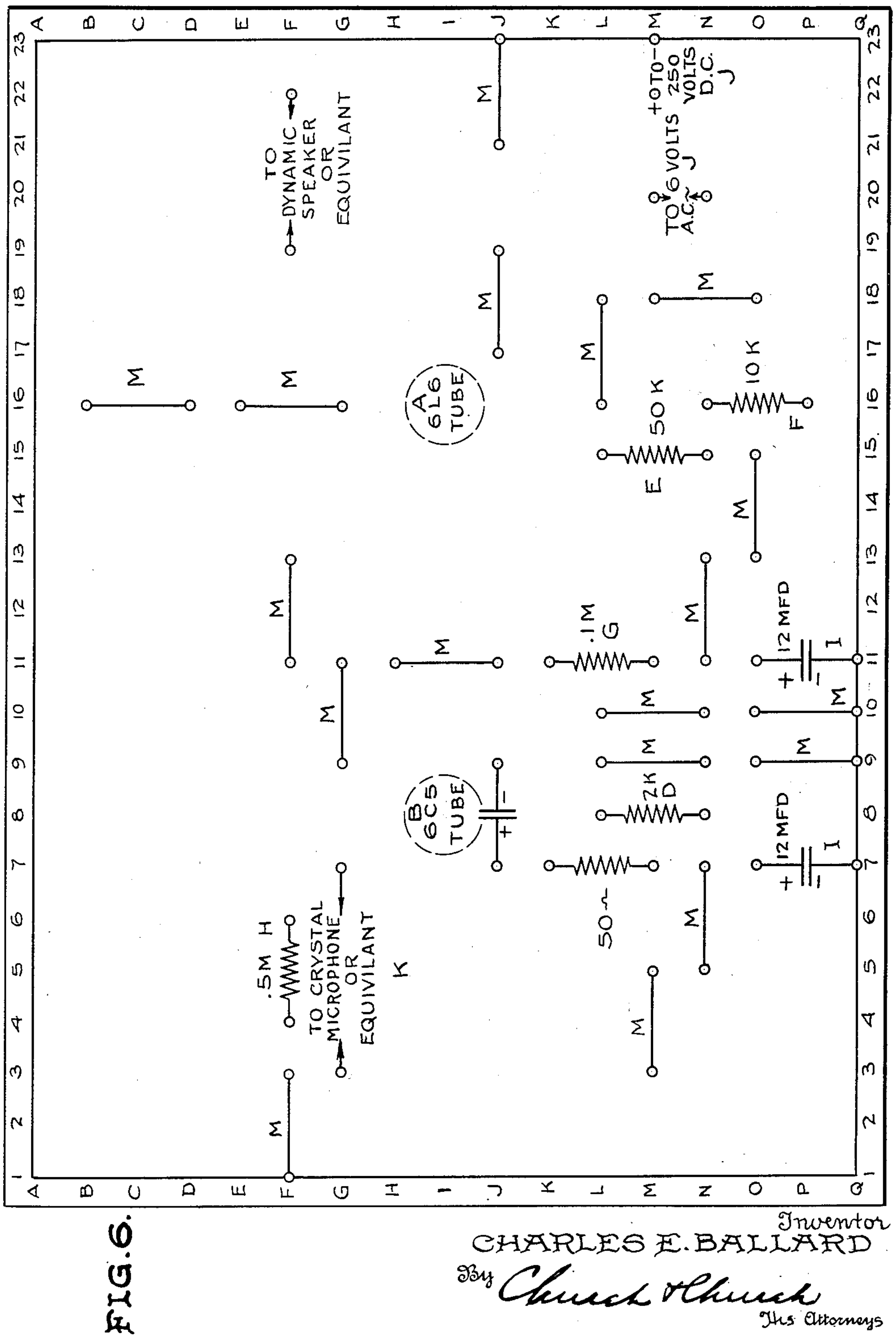
Figure 7A:
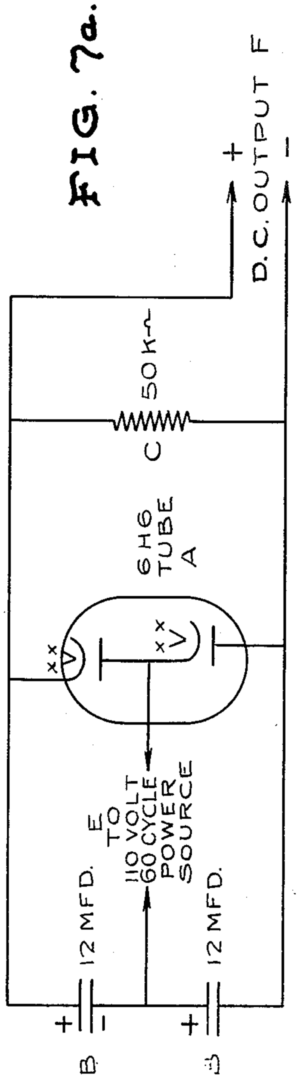
Figure 7:
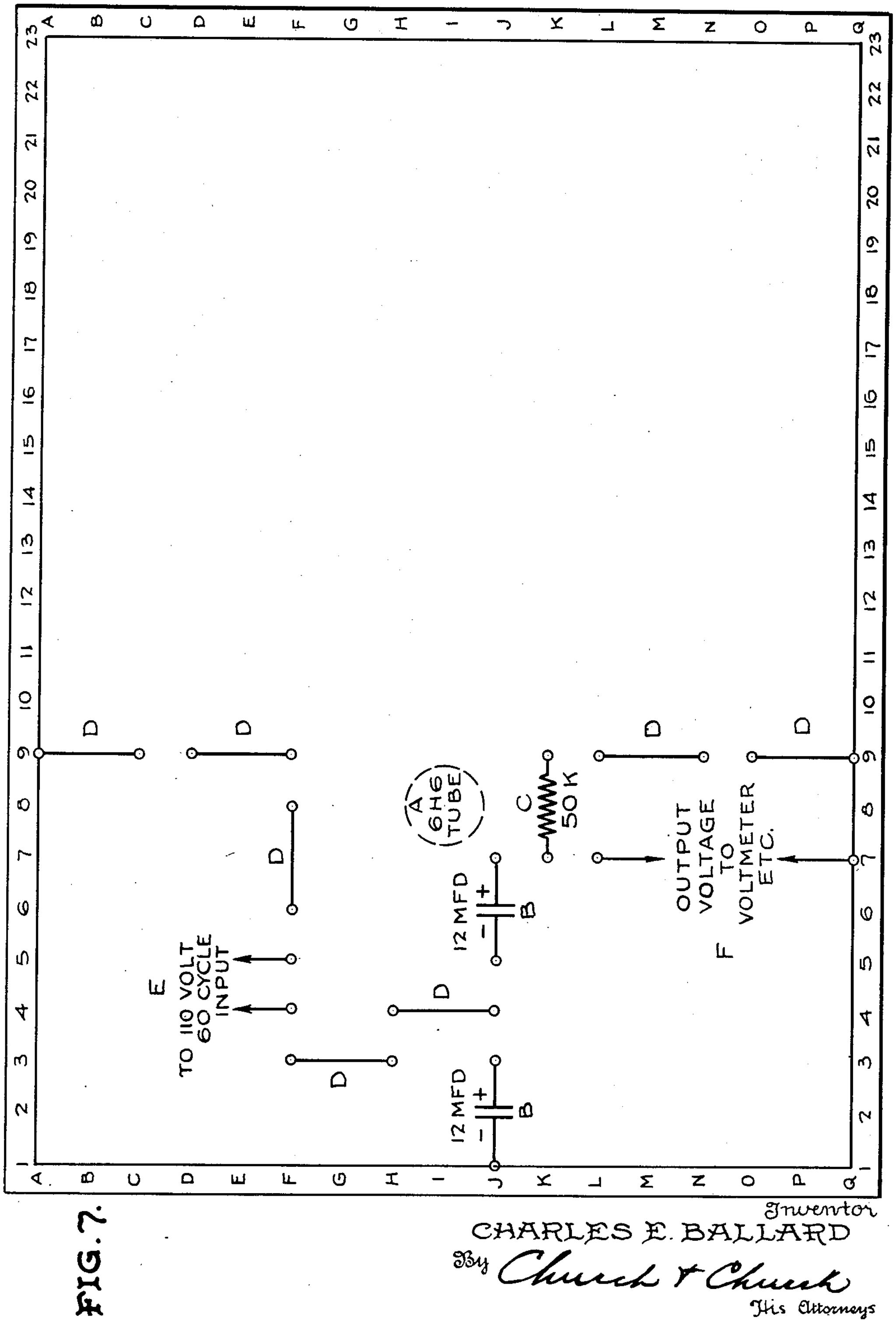

Figs. 6 and 6ᵃ are diagrammatical views illustrating one circuit that can be set up on the board involving two units; and Figs. 7 and 7ᵃ are diagrammatical views illustrating a circuit which involves only one unit of the board.

Preferably, the board is of the multi-unit type and each unit may be described as consisting of a tube socket, a band of primary contacts arranged in groups around the socket with one contact of each group connected to a socket terminal, positive and negative power lines with multiple terminals arranged around or encircling but spaced from said primary contacts, and a band of connector contacts intermediate to said primary contacts and power lines, all of said contacts and power line terminals being so arranged that by the use of various component parts or instrumentalities to be later described, connections can be established from the tube socket to the power lines. In addition to this basic arrangement for the individual unit, additional contacts are provided on the multi unit board to facilitate the establishment of interconnecting circuits between different units or from one section of the board to another remote section and a still further line of contacts is provided between each two units whereby connections may be established directly across the board between the interconnecting circuit lines at opposite sides thereof.

For instance, in the two-unit board illustrated in Figure 1 there are two multi-terminal tube sockets 30, 30ᵃ, one for each unit and in the board described, each is adapted to receive a tube of the octal type. In using an octal tube socket such as illustrated, two terminals 102, 107 of each socket are connected to two contacts 33, 34 by wires (not shown), one wire extending from contact 33 to the socket terminals 102 and the other wire running from contact 34 to socket terminals 107. These contacts 33, 34 are adapted to be connected to a feed line which will supply a current of proper voltage (approximately 6.3 volts A. C.) to light the filaments or heaters of tubes placed in the sockets. Of course, it will be understood that the terminals of the tube socket which are connected to contacts 33, 34, will vary depending upon the type of tube used. Immediately surrounding each socket are the so-called primary contacts 35, 36, 37, 38, 39, 40, each adapted to be connected by wires (not shown) to one of the terminals of its associated tube socket, depending upon the number of pins carried on the bases of the tubes used in the sockets. Each primary contact is connected to additional contacts 41 which are arranged on the board in various patterns to facilitate the assembly of component parts in desired circuits as will later be described. Contacts 35 and 39 each have two additional contacts 41 associated therewith in a straight line; contacts 36 each have three additional contacts 41 associated therewith in L-shaped arrangements; contacts 37 each have three contacts 41 connected thereto in the form of a horizontally disposed T; contacts 38 and 40 each have four contacts 41 associated therewith in oppositely reversed L formations. Thus, there is provided a band of connected primary contacts surrounding the tube socket of each unit. The two primary contacts 109, 110, associated with each socket are also connected to additional contacts 41, but as the present description is based on the use of an octal tube these two primary contacts are not wired to any of the socket terminals.

Extending around the board are the positive and negative power lines 42, 43 for supplying a direct current of approximately 250 volts. The positive line 42 has a multiplicity of contacts or terminals 44 provided thereon and the negative line 43 is similarly provided with a plurality of contacts or terminals 45.

The primary contacts are adapted to be connected to desired contacts or terminals in these power lines but, to lend flexibility of usage to the board, this connection is not made direct but through a band of so-called connector contacts 46 interposed between positive power line 42 and the band of primary contacts. As the board and its entire assembly of contacts preferably takes a substantially rectangular shape, these so-called connector contacts which are connected together in alined groups of three in most instances, may be generally described as being disposed at right angles to the contiguous portion of the positive power line 42. It will also be observed that the various contacts, including the power line terminals are arranged in rows transversely and lengthwise of the board and to facilitate designation of any particular contact these rows are numbered 1 to 23 lengthwise of the board and lettered A to Q crosswise of the board. Using these designating numerals and letters, particular attention is called to the twelfth row of contacts. It will be observed that this particular row is located at a line medial of the tube sockets 30, 30ª, and might be described as dividing the board into the two units previously mentioned. In this connection, means are provided for facilitating interconnections between the two units, or from one point of the board to another point remote therefrom. These means consist of two interconnector lines 47, 48, which extend lengthwise of the board the full length of the two units. Each of these interconnector lines 47, 48, are provided with contacts 49 at the ends of the board and with contacts 50 centrally of the two units, these contacts 50 being located in the medial line of contacts 12 previously mentioned. In addition, other contacts 50ª may be provided in line 47 intermediate its centrally located contacts 50 and the ends of said lines so as to facilitate connecting various portions of either unit to a larger selection of contacts 46. In other words, these interconnector lines 47, 48 with their associated contacts 49, 50 and 50ª render still greater flexibility in the use of the board.

It will be appreciated that the board may be reduced to a single unit by omitting one of the sockets and its associated primary contacts and connector contacts while, on the other hand, additional units may be added by duplicating these individual units on the board.

In the use of the board, circuits of various types, as previously mentioned, can be built up or established, depending upon the component parts that are used therein and the arrangement of those parts on the board. Preferably, as shown in Figs. 5, 5ª and 5ᵇ, the various contacts are all preferably in the form of so-called "banana" jacks, indicated at 50, which are adapted to be threaded into the board 51ª and which have the usual sockets to permit the component parts or electrical devices to be plugged into them. Also, as shown in Fig. 1, all of these "banana" jacks or contacts are equi-distantly spaced from one another, both transversely and longitudinally of the board so that electrical devices of various types can be used therein so long as the plugs of said devices are spaced apart a unit of length, or a multiple thereof corresponding to the unit of length by which the "banana" jacks are spaced from one another. For instance, a transformer 78 is illustrated in Figs. 2, 2ª and 2ᵇ. As shown in Fig. 2, the base 79 of the transformer has four plugs 72 depending therefrom, one at each corner of the base. As shown in Figs. 2ª and 2ᵇ these plugs 72 are spaced laterally of the transformer base a distance corresponding to the distance between two contiguous contacts or "banana" jacks on the board while, lengthwise of the transformer base they are spaced apart a distance double the distance between the contiguous "banana" jacks. Figs. 3, 3ª and 3ᵇ show a simple two-terminal or two-plug mounting strip 84 on which is mounted a resistor unit 74. In this instance the mounting strip or base has only two banana plugs 82 spaced apart double the distance between the individual contacts in board 51. An instance of a three-plug unit is shown in Figs. 4, 4ª and 4ᵇ where the mounting strip 84 has three alined plugs 82 depending from its base with the plugs spaced apart a distance corresponding to the spacing of the banana jacks in the board. In this instance the mounting strip carries an inductor 83. It will be appreciated that the board is not limited to use with these component parts only. Those shown and described are merely given as examples, as component parts of all varieties, chosen with proper consideration as to physical size, may be used, more than four plugs being provided on mounting strips for component parts if additional circuit contacts or more mechanical support are required.

Using the designating numerals and letters, and referring to Figs. 1, 6 and 6ª, there is illustrated a circuit which is designated as a low gain direct coupled amplifier circuit. In setting up this circuit on the board, the following component parts are arranged on the board as indicated in Fig. 6, wherein eighteen connectors M are shown plugged in to connect the contacts B16, D16; E16, G16; F1, F3; F11, F13; G9, G11; H11, J11; J17, J19; J21, J23; L16, L18; M3, M5; L9, N9; L10, N10; M18, O18; N5, N7; N11, N13; O13, O15; O9, Q9; and O10, Q10. A 6L6 vacuum tube is indicated at A in socket 30; a 6C5 vacuum tube at B in socket 30ª; a 50 ohm 1 watt resistor C connects contacts K7, M7; a 2000 ohm 5 watt resistor D connects contacts L9, N9; a 50,000 ohm 1 watt resistor E connects contacts L15, N15; a 10,000 ohm 1 watt resistor F connects contacts N16, P16; a 100,000 ohm 1 watt resistor G connects contacts K11, M11; a 500,000 ohm 1 watt resistor H connects contacts F4, F6; three 12 mfd., 450 v. electrolytic condensers contacts J7, J9; O7, Q7 and O11, Q11, respectively; a crystal microphone or other high impedance signal source is plugged into contacts G3, G7 as indicated at K and a loud speaker, including matching transformer is plugged into contacts F19, F22.

Figure 6A:
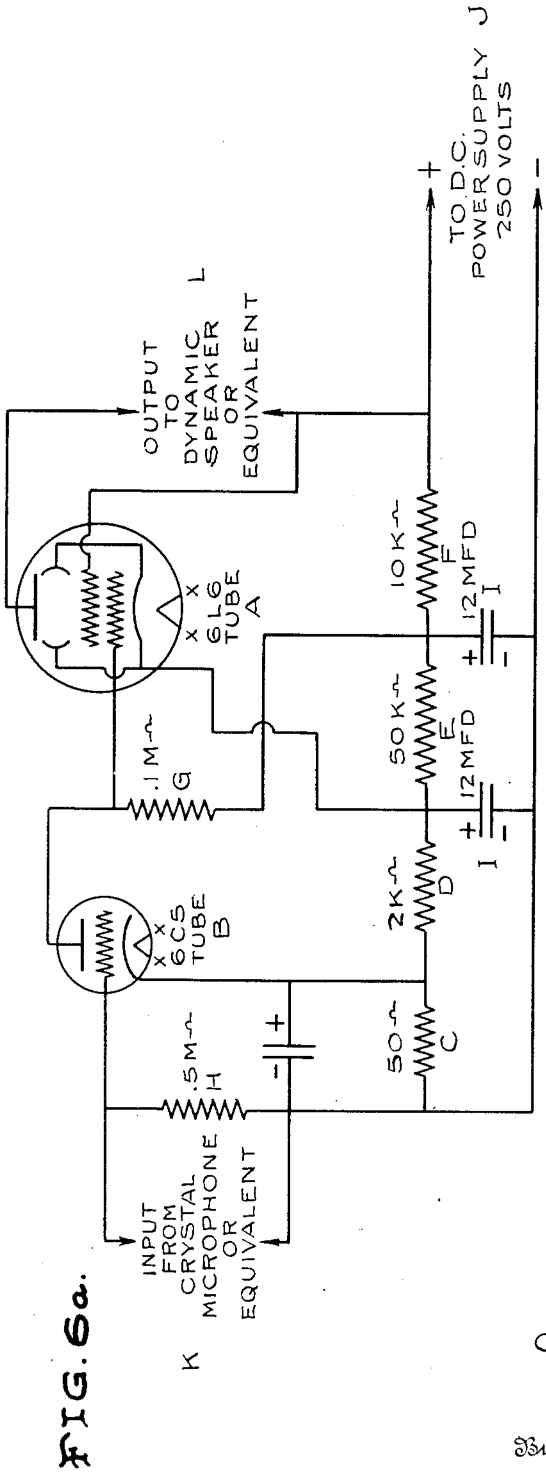

Figure 6 also indicates contacts M20, N20 as being connected to a power supply to furnish 6 volts A. C. and the power supply lines 42, 43 as connected to a 250 volts D. C. by contacts M22, M23. The circuit thus established is shown diagrammatically in Fig. 6a but to simplify this illustration the eighteen connectors M and the connection between contacts M20, N20 and the tube sockets have been omitted. In this hook-up primary contacts are connected to the socket terminals as follows: contacts 35 at J9, J17 are connected to the so-called No. 1 terminals of their respective sockets, these two terminals being indicated at 101; contacts 40 at H9, H17 are connected to the No. 3 terminals indicated at 103; contacts 39 at H8, H16 are connected to the No. 4 terminals indicated at 104; contacts 38 at H7, H15 are connected to the No. 5 terminals indicated at 105; contacts 37 at I7, I15 are connected to the No. 6 terminals indicated at 106; and contacts 36 at J7, J15 are connected to terminals No. 8 indicated at 108. This entire circuit is only one of a multitude which can readily be arranged on the board. As with any other operative unit of electronic equipment, tests can be made with suitable instruments to determine correct operation or abnormalties. Voltages and currents in various component parts or in the circuit can be checked, measured, or calculated; waveforms may be examined; defective parts or parts having electrical values differing from prescribed values may be substituted and the effects noted and troubleshooting practices developed. Again, component parts may be incorrectly assembled purposely for troubleshooting practice. Of course, when the various component parts are properly assembled, the hook-up will serve any function for which its commercial counterpart may be fitted.

Another circuit, using only one unit of the board, is as follows: Assuming that the tube sockets are connected in the same manner as just described in the previous example, a 6HC vacuum tube is inserted in socket 30a, two 12 mfd. 450 volt electrolytic condensers B are used to connect contacts J1, J3 and J5, J7; a 50,000 ohm 5 watt resistor C connects K7, K9 with polarity as indicated in Fig. 7; seven connectors D are plugged into contacts A9, C9; D9, F9; F6, F8; F3, H3; H4, J4; L9, N9 and O9, Q9; contacts F4, F5 are connected as indicated at E to a source of input power A. C. 110 to 120 volts, which in this instance is to be rectified; and a suitable output indicator or external load such as a voltmeter or oscilloscope indicated at F is attached to contacts L7, Q7, at which point the rectified and partially filtered D. C. output voltage is available for examination. This arrangement constitutes a low power full wave voltage double rectifier circuit using a single socket or a single unit. Obviously, in addition to using single and double unit arrangements such as are disclosed herein, additional units can be provided on the board thus still further increasing the versatility of the latter.

As will be appreciated, the circuits or combinations that may be assembled on the present board with a relatively small assortment of component parts is practically unlimited, especially in view of the fact that as many duplicate units as are necessary or desirable can readily be provided. It will also be appreciated that persons with little or no knowledge of radio can readily assemble workable electronic circuits on the board by following comparatively simple information in the form of diagrams like those shown in Figs. 6, 6a, or 7, 7a. On the other hand, experienced persons may utilize the board beneficially in developing troubleshooting and engineering practice. Also, as previously indicated, the board is capable of extensive use in class work in educational institutions.

It should be noted that the different groups of "banana" jacks or contacts on the board are preferably colored differently. In Fig. 1 the various contacts have been lined to designate colors, the primary contacts and contacts 33, 34, being colored yellow for instance, while the contacts for the interconnector lines 47, 48, are colored green and the contacts or terminals 44 in the positive power line 42 are colored red and the terminals 45 in the negative power line 43 are colored black. All the other contacts may be white or otherwise colored. It is also advantageous to make the mounting strips 84 or the supporting bases of other component parts such as the base 79 of transformer 78 of a transparent material. This use of colored contacts or terminals on the board and transparent mountings for the various component parts facilitates inspection of the board when the various instrumentalities are mounted therein for the purpose of determining the location of the latter or the "banana" jacks into which those component parts have been connected.

What I claim is:

1. A board for demonstrating electrical circuits comprising a panel of insulating material, a multi-terminal tube socket centrally located on said panel, a plurality of primary contacts arranged in longitudinal and transverse rows on said panel and forming a rectangular band surrounding said socket, each of said primary contacts being connected to a different terminal of said socket, a multiplicity of secondary contacts on said panel arranged in equidistantly spaced longitudinal and transverse rows parallel to said rows of primary contacts so all of said contacts are equidistantly spaced from contiguous contacts, electrical connections between each of said primary contacts and neighboring secondary contacts forming primary groups of interconnected contacts in the area around said socket and respectively connected to the terminals thereof for connecting circuit components to said terminals, electrical connections between contacts in the outermost longitudinal and transverse rows of contacts, electrical connections between the next outermost longitudinal and transverse rows of contacts, said two connected outermost rows constituting positive and negative power lines extending around the margin of said panel, the secondary contacts between said primary groups and said power lines being arranged in connector groups, and electrical connections between the contacts in each connector group, each of said connector groups including one contact adjacent a contact in a primary group, one contact adjacent a contact in said power lines, and one contact adjacent a contact in another connector group for connecting circuit components to said primary groups and said power lines.

2. An apparatus for demonstrating different radio circuit arrangements involving at least one multi-terminal tube and a plurality of conventional radio circuit components, such as resistors, condensers, rectifiers and the like, at least two separable connectors on each of said circuit components, the connectors of all of said components being in line and equidistantly spaced or spaced at one or more multiples of a selected unit of spacing from each other, a board having thereon at least one multi-terminal tube socket and a plurality of component accommodating contacts arranged in longitudinal and transverse rows of contacts, adjacent ones of said rows being parallel and spaced from each other at the same unit distance as said connectors, the contacts in the area of the board immediately surrounding said socket being arranged in primary groups, electrical connections between the contacts of each primary group, electrical connections from each primary group to a different terminal on said socket, electrical connections between the contacts in the outermost longitudinal and transverse rows around the marginal edge of the board, electrical connections between the contacts in the next outermost longitudinal and transverse rows around the margin of the board, said connected marginal rows constituting positive and negative power lines, the contacts in the area between said primary groups and said power lines being arranged in auxiliary groups, electrical connections between the contacts of each auxiliary group, each of said auxiliary groups including one contact adjacent a contact in a primary group, one contact adjacent a contact in said power lines, and one contact adjacent a contact of another auxiliary group, whereby different alternative circuit arrangements between said socket and said power line can be demonstrated on the board by connecting the connectors on said components to the contacts of different groups on said board to form circuits between said socket and said power lines.

CHARLES E. BALLARD.

REFERENCES CITED

The following references are of record in the file of this patent:

UNITED STATES PATENTS

| Number | Name | Date |
|---|---|---|
| 1,271,641 | Werwath | July 9, 1918 |
| 1,968,039 | Hornberger | July 31, 1934 |
| 2,390,706 | Hearon | Dec. 11, 1945 |

FOREIGN PATENTS

| Number | Country | Date |
|---|---|---|
| 161,587 | Switzerland | July 17, 1933 |
| 223,402 | Great Britain | 1924 |
| 344,668 | Great Britain | 1931 |
| 571,411 | Germany | Mar. 2, 1933 |

OTHER REFERENCES

RCA Receiving Tube Manual, page 2, 1942.